US010142365B2

(12) United States Patent
Grubel et al.

(10) Patent No.: US 10,142,365 B2
(45) Date of Patent: Nov. 27, 2018

(54) SYSTEM AND METHODS FOR RESPONDING TO CYBERSECURITY THREATS

(71) Applicant: The Boeing Company, Chicago, IL (US)

(72) Inventors: Brian Christopher Grubel, Glen Burnie, MD (US); Dion Stephen David Reid, Grasonville, MD (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 15/004,480

(22) Filed: Jan. 22, 2016

(65) Prior Publication Data

US 2017/0214707 A1 Jul. 27, 2017

(51) Int. Cl.
*H04L 29/06* (2006.01)
*G06F 9/455* (2018.01)

(52) U.S. Cl.
CPC ...... *H04L 63/1441* (2013.01); *H04L 63/1433* (2013.01); *G06F 9/45558* (2013.01); *G06F 2009/45562* (2013.01); *G06F 2009/45575* (2013.01); *G06F 2009/45587* (2013.01); *G06F 2009/45591* (2013.01); *H04L 63/14* (2013.01); *H04L 63/1408* (2013.01); *H04L 63/1416* (2013.01); *H04L 63/1491* (2013.01)

(58) Field of Classification Search
CPC . H04L 63/14; H04L 63/1408; H04L 63/1416; H04L 63/1433; H04L 63/1441; H04L 63/1491; G06F 9/45558; G06F 9/45562; G06F 2009/45575; G06F 2009/45587; G06F 2009/45591; G06F 2009/45562
See application file for complete search history.

(56) References Cited

U.S. PATENT DOCUMENTS

| 8,112,521 | B2 | 2/2012 | Barnett et al. |
| 8,819,369 | B1 * | 8/2014 | Alappat ............ G06F 17/30088 707/640 |
| 9,065,799 | B2 | 6/2015 | Vanderpol et al. |
| 9,419,857 | B1 * | 8/2016 | Ryan ....................... H04L 63/08 |
| 2004/0122832 | A1 * | 6/2004 | Heil ..................... G06F 11/1464 |

(Continued)

FOREIGN PATENT DOCUMENTS

| WO | 2015051181 A1 | 4/2015 |
| WO | 2015134008 A1 | 9/2015 |

*Primary Examiner* — Ayoub Alata
(74) *Attorney, Agent, or Firm* — Armstrong Teasdale LLP (57) ABSTRACT

A cyber-security monitoring (CSM) computer device for responding to cybersecurity threats is provided. The CSM computer device includes a processor in communication with a memory. The processor is configured to monitor a virtual network including plurality of virtual machines, detect a cybersecurity threat to a first virtual machine of the plurality of virtual machines, generate a second virtual machine based on the first virtual machine, adjust the second virtual machine based on the cybersecurity threat, disconnect the first virtual machine from the virtual network to prevent communication between the first virtual machine and the plurality of virtual machines included in the virtual network, and connect the second virtual machine to the virtual network.

20 Claims, 8 Drawing Sheets

(56) References Cited

U.S. PATENT DOCUMENTS

| | | | |
|---|---|---|---|
| 2006/0272006 A1* | 11/2006 | Wei | H04L 51/12 |
| | | | 726/2 |
| 2012/0158395 A1* | 6/2012 | Hughes | H04L 63/00 |
| | | | 703/21 |
| 2013/0073892 A1* | 3/2013 | Whitlock | G06Q 10/0633 |
| | | | 714/4.1 |
| 2014/0013431 A1 | 1/2014 | Bush et al. | |
| 2014/0075506 A1* | 3/2014 | Davis | H04L 67/12 |
| | | | 726/3 |
| 2014/0215621 A1 | 7/2014 | Xaypanya et al. | |
| 2014/0237464 A1* | 8/2014 | Waterman | G06F 8/65 |
| | | | 717/172 |
| 2014/0380485 A1 | 12/2014 | Ayyagari et al. | |
| 2016/0232024 A1* | 8/2016 | Hamilton, II | G06F 9/45558 |

* cited by examiner

SYSTEM AND METHODS FOR RESPONDING TO CYBERSECURITY THREATS

BACKGROUND

The field of the present disclosure relates generally to responding to cybersecurity threats and, more specifically, to automatically responding to cybersecurity threats to a computer network in an aviation environment.

Aviation platforms and infrastructures consist of many complex, networked, and hierarchical systems that perform various aviation computing needs. Some aviation platforms, such as aircraft standalone systems are migrating to e-Enabled networked aerospace approaches for greater operational performance efficiencies. The adoption of e-Enabled architectures and technologies increases the operational and performance efficiencies that results from being networked. The e-Enabling of aircraft systems with aerospace-specific and commercial networking solutions, enables communication between systems and across aircraft systems domain boundaries.

However, the interconnection of aircraft systems domains and improved ability to communicate with on-board and off-board systems increases the risk of current and emerging cybersecurity attacks. Furthermore, aviation embedded systems and controllers utilize General Purpose Computing (GPC) hardware and commercial software operating systems to reduce cost and provide added functionality. The use of GPC hardware and commercial software increases the risk of cybersecurity attacks that leverage existing vulnerabilities of the deployed software and hardware implementations. Hardware-based redundancy may reduce the risks of outages, but additional hardware is used very sparingly within aircraft due to weight issues, where every additional pound could cost tens of thousands of dollars in fuel expenses over time.

BRIEF DESCRIPTION

In one aspect, a cyber-security monitoring (CSM) computer device for responding to cybersecurity threats is provided. The CSM computer device includes a processor in communication with a memory. The processor is configured to monitor a virtual network including plurality of virtual machines, detect a cybersecurity threat to a first virtual machine of the plurality of virtual machines, generate a second virtual machine based on the first virtual machine, adjust the second virtual machine based on the cybersecurity threat, disconnect the first virtual machine from the virtual network to prevent communication between the first virtual machine and the plurality of virtual machines included in the virtual network, and connect the second virtual machine to the virtual network.

In another embodiment, a system for responding to cybersecurity threats is provided. The system includes a plurality of computer devices configured to run a virtual network including a plurality of virtual machines, and a cybersecurity monitoring (CSM) computer device including a processor in communication with a memory. The CSM computer device is configured to monitor the virtual network, detect a cybersecurity threat to a first virtual machine of the plurality of virtual machines, generate a second virtual machine based on the first virtual machine, adjust the second virtual machine based on the cybersecurity threat, disconnect the first virtual machine from the virtual network to prevent communication between the first virtual machine and the plurality of virtual machines included in the virtual network, and connect the second virtual machine to the virtual network.

In yet another embodiment, a method for responding to cybersecurity threats is provided. The method is implemented using a cyber-security monitoring (CSM) computer device. The CSM computer device includes a processor in communication with a memory. The method includes monitoring a virtual network including plurality of virtual machines, detecting a cybersecurity threat to a first virtual machine of the plurality of virtual machines, generating a second virtual machine based on the first virtual machine, adjusting the second virtual machine based on the cybersecurity threat, disconnecting the first virtual machine from the virtual network to prevent communication between the first virtual machine and the plurality of virtual machines included in the virtual network, and connecting the second virtual machine to the virtual network.

DETAILED DESCRIPTION

The implementations described herein relate to systems and methods for responding to cybersecurity threats and, more specifically, for automatically responding to cybersecurity threats to a computer network in an aviation environment. More specifically, a cybersecurity monitoring ("CSM") computer device monitoring for one or more computer systems or computer networks for cyber-security threats and attacks, identifying detected cybersecurity threats and attacks, responding to the detected cybersecurity threats and attacks, transmitting information about the detected cybersecurity threats and attacks to a ground controller, and receiving updates about potential cybersecurity threats and attacks to the ground controller.

In some embodiments, the CSM computer device monitors a virtual network that includes a plurality of virtual machines. The CSM computer device detects one or more cybersecurity threats to a first virtual machine of the plurality of virtual machines. The CSM computer device generates a second virtual machine based on the first virtual machine. The CSM computer device adjusts the second virtual machine based on the cybersecurity threat. The CSM computer device disconnects the first virtual machine from the virtual network to prevent communication between the compromised first virtual machine and the plurality of virtual machines included in the virtual network. The CSM computer device then connects the second virtual machine to the virtual network.

Effectively, the CSM computer device replaces the compromised virtual machine with a new version of the virtual machine. The new virtual machine has been adjusted based on the cybersecurity threat that was identified as compromising the first virtual machine, in an effort to prevent the new virtual machine to be resistant to compromise by the cybersecurity threat. In some embodiments, the CSM computer device monitors the cybersecurity threat on the virtual machine. And in some further embodiments, the CSM computer device even spoofs commands and responses to the disconnected virtual machine in an effort to prevent the cybersecurity threat from determining that the compromised virtual machine has been disconnected from the network. The CSM computer device also collects information about the cybersecurity threat to prevent future compromises or to take future action against the source of the cyber security threat, such as in criminal court. In the example embodiment, the disconnected virtual machine is eventually powered down to conserve computing resources.

In still further embodiments, the CSM computer device is in communication with a remote central controller that includes greater knowledge about cybersecurity threats and responses to those threats. The CSM computer device communicates with the remote central controller for updates on potential cybersecurity threats, request proposed courses of action for active security threats, and to report identified cybersecurity threats.

Described herein are computer systems such as the CSM computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, the term "cybersecurity threat" includes an unauthorized attempt to gain access to a computer network or system. Cybersecurity threats, also known as cyber-attacks or cyber-threats, attempt to breach computer systems by taking advantage of vulnerabilities in the computer systems. Some cybersecurity threats include attempts to damage or disrupt a computer network or system. These cybersecurity threats may include, but are not limited to, active intrusions, spy-ware, mal-ware, viruses, and worms. Cybersecurity threats may take many paths (also known as attack paths) to breach a system. These paths may include operating system attacks, misconfiguration attacks, application level attacks, and shrink wrap code attacks. Cybersecurity threats may be introduced by individuals or systems directly accessing the computer system or remotely via a communications network.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

Figure 1:
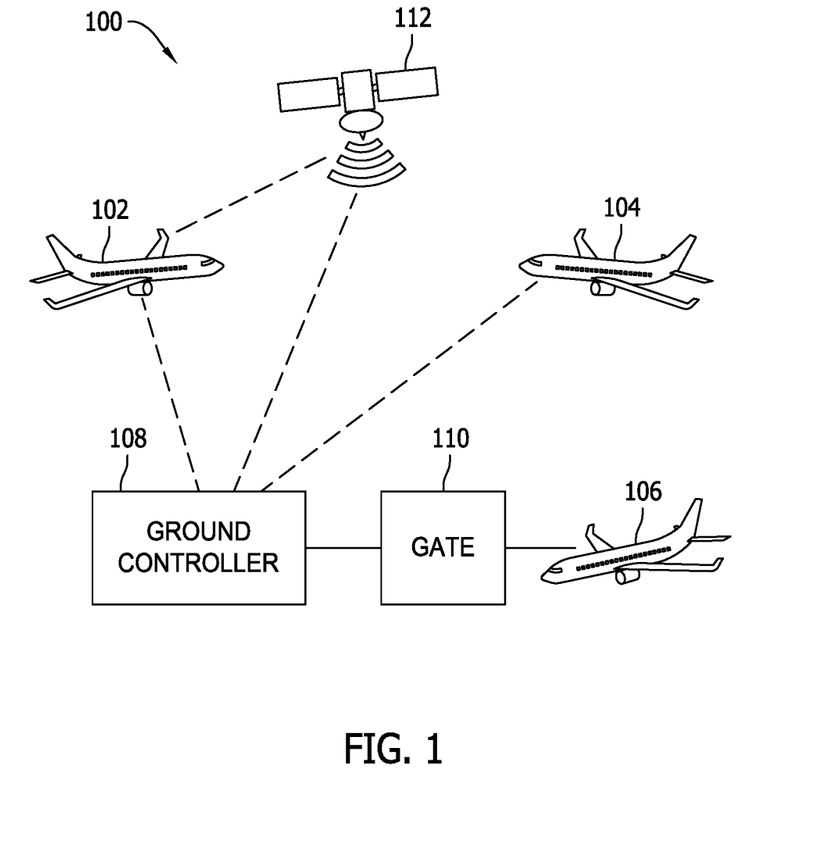
FIG. 1 illustrates a block diagram of an example overview of an aviation environment in accordance with one embodiment of the present disclosure.

FIG. 1 illustrates a block diagram of an example overview of an aviation environment 100 in accordance with one embodiment of the present disclosure. Aviation environment 100 includes a plurality of aircraft 102, 104, and 106, which are in communication with a ground controller 108. In the example embodiment, aircraft 102 and 104 are in flight and aircraft 106 is at a gate 110. In some embodiments, in-flight aircraft 102 and 104 communicate with ground controller 108 through a cellular connection. In other embodiments, aircraft 102 communicates with ground controller 108 through satellite 112. In the example embodiment, aircraft 106 communicates with ground controller 108 through gate 110. In some embodiments, the connection to gate 110 is via a wireless connection. In other embodiments, the connection is a direct wired connection between aircraft 106 and gate 110. Gate 110 then relays data between ground controller 108 and aircraft 106. Gate 110 may communicate with ground controller 108 through the Internet through many interfaces including, but not limited to, at least one of a network, such as the Internet, a LAN, a WAN, an integrated services digital network (ISDN), a dial-up-connection, a digital subscriber line (DSL), a cellular phone connection, a satellite connection, and a cable modem.

In the example embodiment, communication between gate 110 and aircraft 106 is more desirable for large exchanges of information than the communication between in-flight aircraft 102 and 104 and ground controller 108. In this embodiment, critical information is communicated while aircraft 102 and 104 are in-flight, while general information is communicated once the aircraft is connected to a low-cost connection on the ground, such as at gate 110. For example, communication at gate 110 may be less expensive than communication while aircraft 102 and 104 is in flight. Gate based communication may also have higher bandwidth, faster speed, improved clarity, and different security than in-flight communication. In addition, the attributes of the communication with in-flight aircraft 102 and 104 may change based on the location of the corresponding aircraft 102 and 104, the weather patterns, and other phenomena that can affect communication and data transfer.

In the example embodiment, each aircraft 102, 104, and 106 includes a cybersecurity database that includes potential cybersecurity threats, attack paths, potential responses to those cybersecurity threats, and configuration data about the aircraft. In the example embodiments, ground controller 108 includes a cybersecurity database that includes potential cybersecurity threats, attack paths, potential responses to those cybersecurity threats, configuration data about each aircraft 102, 104, and 106 in a fleet of aircraft, potential upgrades and modifications to software and hardware contained on each aircraft on the fleet, and information on past attacks on various aircraft. Ground controller 108 is configured to communicate with aircraft in real-time to provide information about active cybersecurity threats. Ground controller 108 is also configured to communicate with aircraft to receive information about cybersecurity threats encountered by other aircraft and to provide updates to the aircraft's cybersecurity database.

Figure 2:
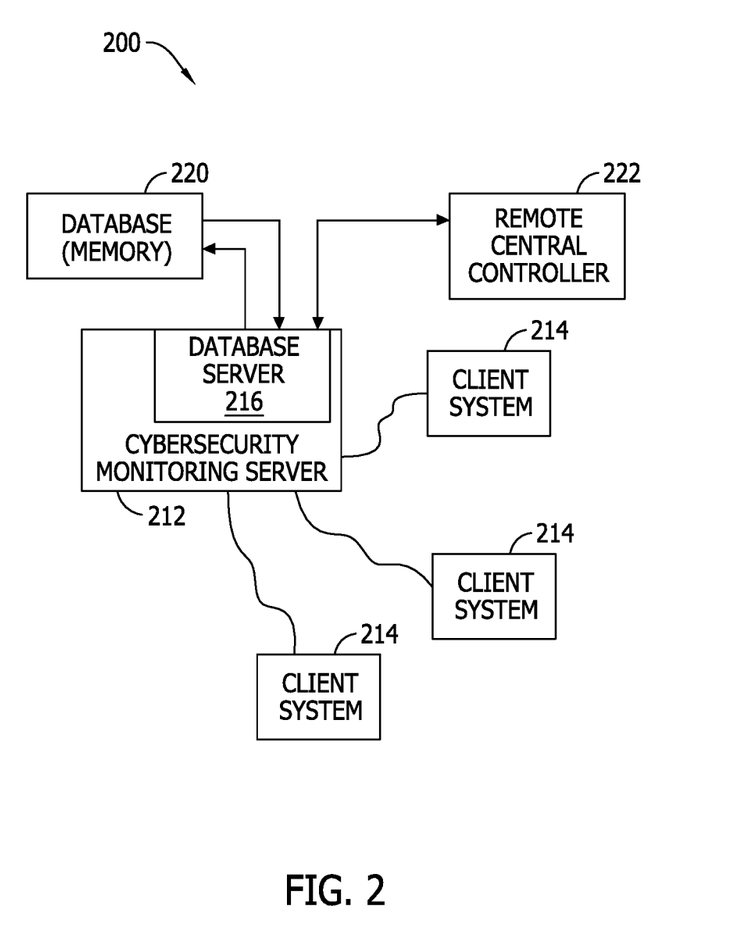
FIG. 2 is a simplified block diagram of an example system for responding to cybersecurity threats, such as in the aviation environment shown in FIG. 1.

FIG. 2 is a simplified block diagram of an example system 200 for responding to cybersecurity threats, such as in an aviation environment 100 shown in FIG. 1. In the example embodiment, system 200 is used for monitoring for one or more computer systems or computer networks for cybersecurity threats and attacks, identifying detected cybersecurity threats and attacks, responding to the detected cybersecurity threats and attacks, transmitting information about the detected cybersecurity threats and attacks to ground controller 108 (shown in FIG. 1), and receiving updates about potential cybersecurity threats and attacks from ground controller 108. In addition, system 200 is a cyber-security management system that includes a cyber-security monitoring (CSM) computer device 212 (also known as a CSM server) configured to monitor for and respond to cybersecurity threats. As described below in more detail, CSM server 212 is configured to monitor a virtual network including plurality of virtual machines, detect a cybersecurity threat to a first virtual machine of the plurality of virtual machines, generate a second virtual machine based on the first virtual machine, adjust the second virtual machine based on the cybersecurity threat, disconnect the first virtual machine from the virtual network to prevent communication between the first virtual machine and the plurality of virtual machines included in the virtual network, and connect the second virtual machine to the virtual network. In the example embodiment, the disconnected virtual machine is eventually powered down to conserve computing resources.

In the example embodiment, client systems 214 are computers that include a web browser or a software application, which enables client systems 214 to communicate with CWM server 212 using the Internet, a local area network (LAN), or a wide area network (WAN). In some embodiments, client systems 214 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 214 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In some embodiments, client systems 214 are computer devices that control the operation of aircraft 102.

In some embodiments, client systems 214 are known as line replaceable units (LRU). These client systems 214 include, but are not limited to, flight deck controls (Electronic Flight Bag), avionics data (satellite communication (SATCOM), Aircraft Communications Addressing and Reporting System (ACARS), and avionics), open networking (avionics interfaces, servers, terminal wireless, network appliances, and core network), maintenance (software loading and maintenance access), cabin and airline Services (Flight Operational Quality Assurance (FOQA) Data, FA terminals and crew wireless), Network File Servers (NFS), Mass Storage Devices (MSDs), Crew Wireless LAN Units (CWLUs), and Passengers (in-flight entertainment (IFE), Wi-Fi, and cell phones). In the example embodiment, CSM server 212 is located on an aircraft, such as aircraft 102. In some embodiments, CSM server 212 is decentralized and composed of a plurality of computer devices which work together as described herein.

A database server 216 is communicatively coupled to a database 220 that stores data. In one embodiment, database 220 is a cybersecurity database that includes virtual machine (VM) configurations, cybersecurity threats, attack paths, and responses to the cybersecurity threats. In the example embodiment, database 220 is stored remotely from CSM server 212. In some embodiments, database 220 is decentralized. In the example embodiment, a person can access database 220 via client systems 214 or a remote central controller 222 by logging onto CSM server 212.

CSM server 212 is also in communication with remote central controller 222. In some embodiments, remote central controller 222 is ground controller 108, shown in FIG. 1. Remote central controller 222 is configured to communicate with CSM server 212 via cellular communication, satellite communication, the Internet, or a Wide Area Network (WLAN). In the example embodiment, remote central controller 222 includes a cybersecurity database similar to database 220 which includes information similar to database 220. In the example embodiment, remote central controller 222 is configured to receive information about cybersecurity threats detected by CSM server 212, propose courses of action to response to received information cybersecurity threats, determine cybersecurity trends based on received cybersecurity threats, provide database updates to CSM server 212 in regards to cybersecurity threats, distribute updates about cybersecurity threats to multiple different CSM servers 212, and receive and store forensic evidence about cybersecurity threats for future use. In some embodiments, remote central controller 222 is in communication with a plurality of CSM servers 212. In further embodiments, remote central controller 222 is a part of a security operations center. In the example embodiment, remote central controller 222 is associated with the plurality of aircraft. For example, remote central controller 222 is associated with the airline associated with the plurality of aircraft. In other embodiments, remote central controller 222 is just in communication with the plurality of aircraft. In other embodiments, CSM server 212 is not associated with an aircraft, but instead associated with any computer network of networked client systems that operate as described herein.

Figure 3:
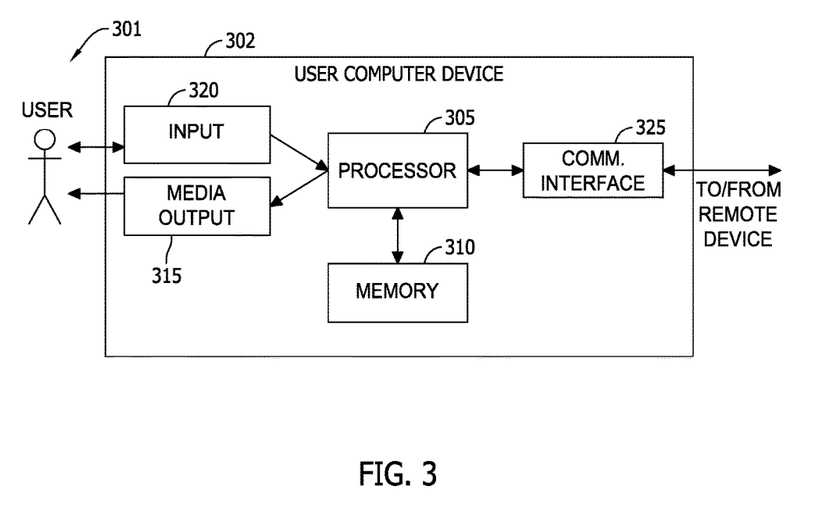
FIG. 3 illustrates an example configuration of a client computer device shown in FIG. 2, in accordance with one embodiment of the present disclosure.

FIG. 3 illustrates an example configuration of client system 214 shown in FIG. 2, in accordance with one embodiment of the present disclosure. User computer device 302 is operated by a user 301. User computer device 302 may include, but is not limited to, client systems 214 (shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as CSM server 212 (shown in FIG. 2). Communication interface 325 may also be in communication with a control system (not shown) of an aircraft, such as aircraft 102 shown in FIG. 1, where user computer device 302 provides instructions to and receives data from the control system. Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from CSM server 212. A client application allows user 301 to interact with, for example, CSM server 212. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
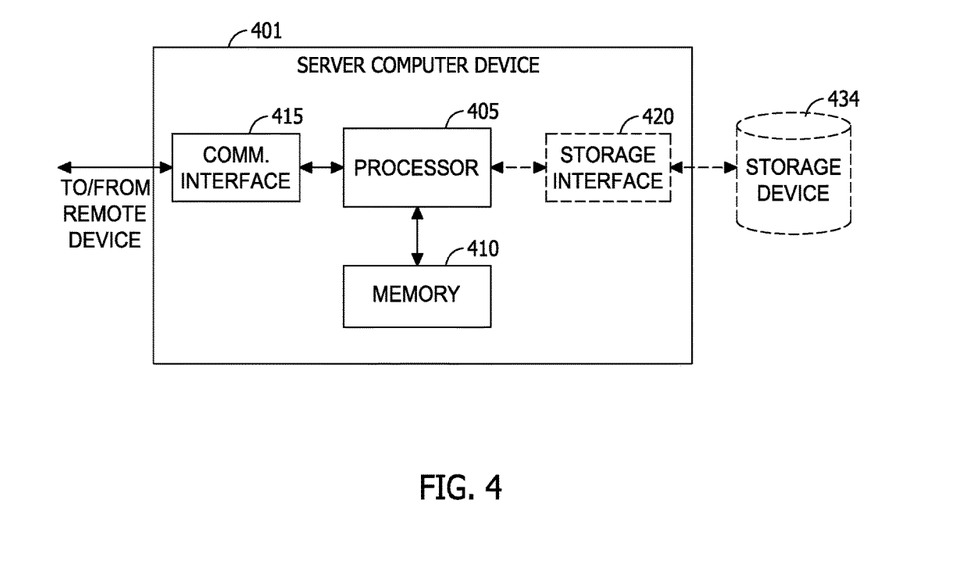
FIG. 4 illustrates an example configuration of the server system shown in FIG. 2, in accordance with one embodiment of the present disclosure.

FIG. 4 illustrates an example configuration of the server system 212 shown in FIG. 2, in accordance with one embodiment of the present disclosure. Server computer device 401 may include, but is not limited to, database server 216, CSM server 212, and remote central controller 222 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, another CSM server 212, remote central controller 222, or client system 214 (shown in FIG. 2). For example, communication interface 415 may receive requests from remote central controller 222 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 8:
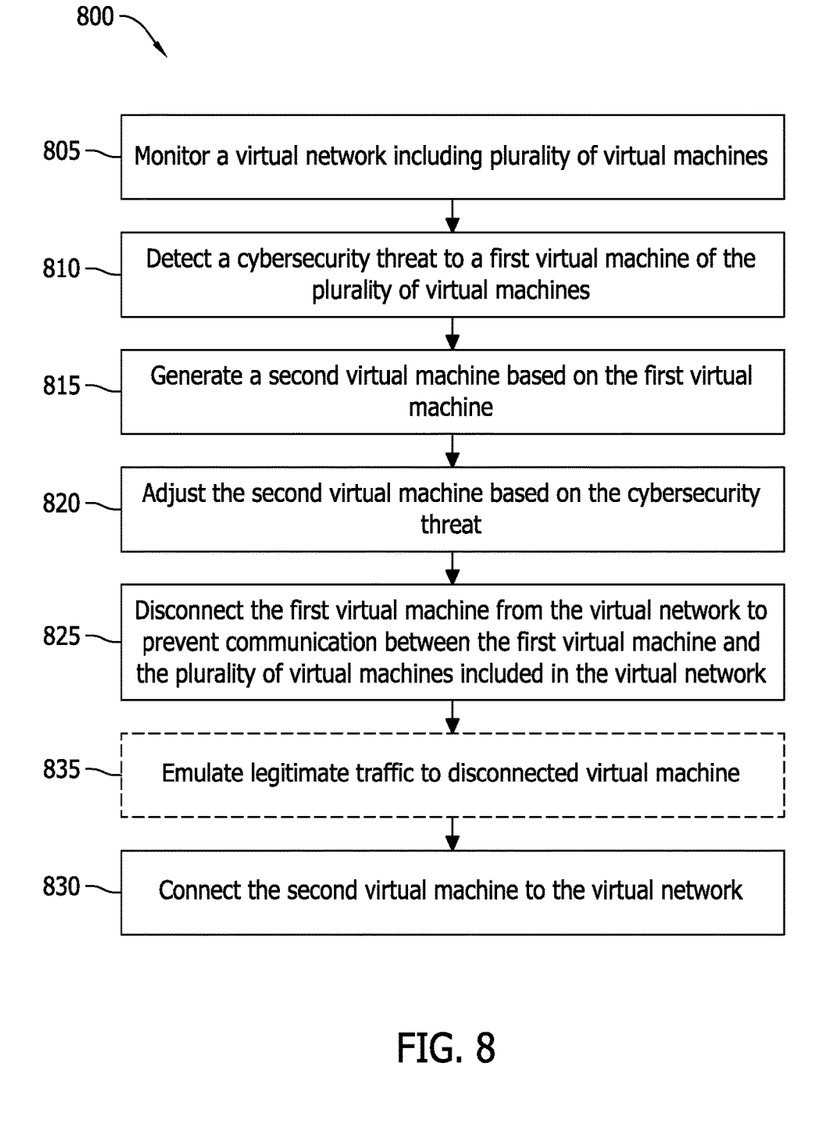
FIG. 8 is a flowchart illustrating an example of a process of responding to a cybersecurity threat using the system shown in FIG. 2, in accordance with one embodiment of the disclosure.

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with the instruction such as illustrated in FIG. 8.

Figure 5:
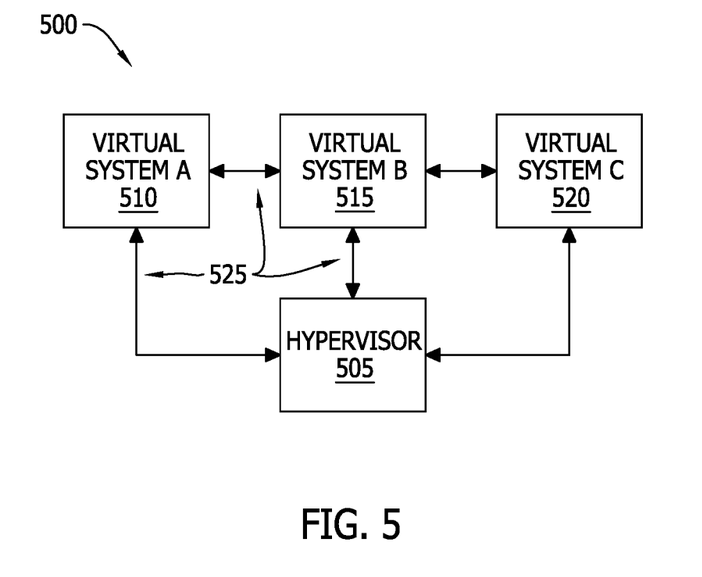
FIG. 5 is a simplified block diagram of a virtual network using the system shown in FIG. 2 with no detected cybersecurity threats.
Figure 6:
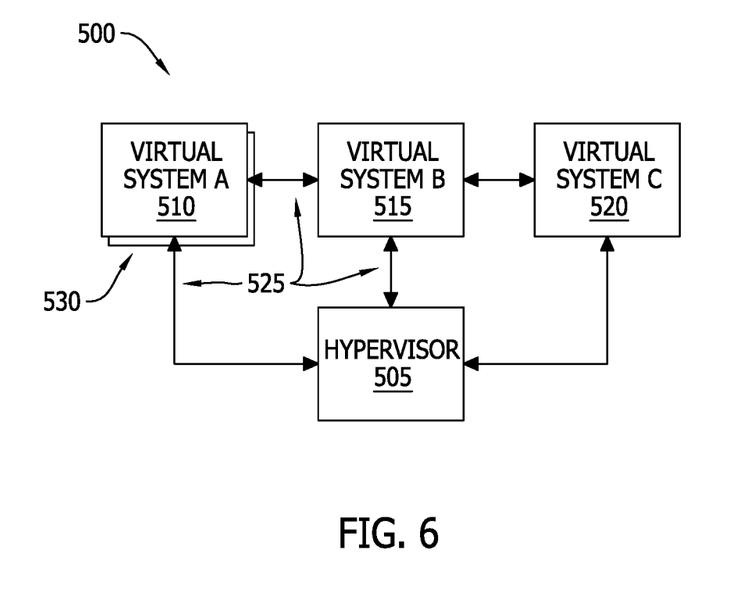
FIG. 6 is a simplified block diagram of the virtual network shown in FIG. 5 after a cybersecurity threat is detected.
Figure 7:
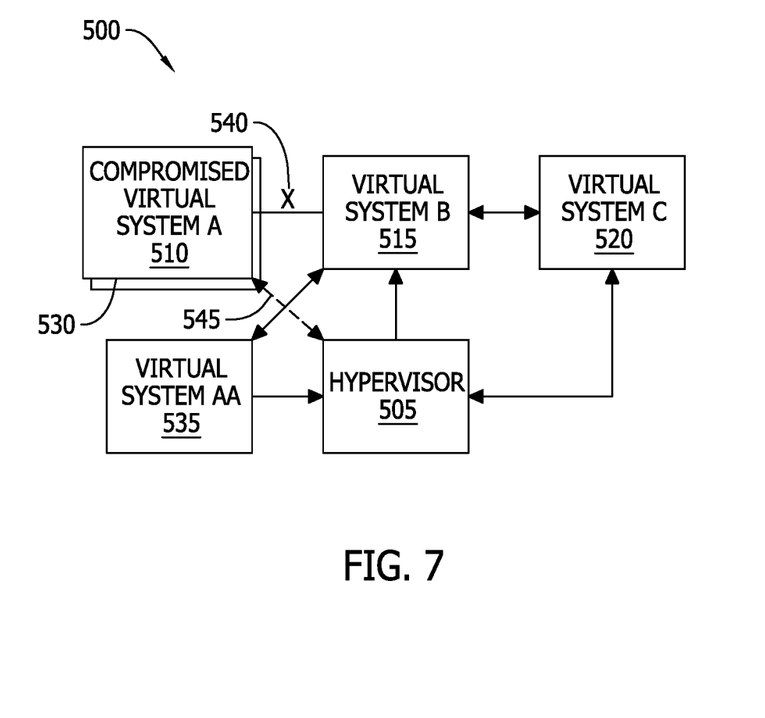
FIG. 7 is a simplified block diagram of the virtual network shown in FIG. 5 showing a potential response to the cybersecurity threat detected in FIG. 6.

FIGS. 5-7 illustrate an example response to a detected cybersecurity threat. FIG. 5 is a simplified block diagram of a virtual network 500 using the system shown in FIG. 2 with no detected cybersecurity threats. In the example embodiment, FIG. 5 illustrates virtual network 500 at time t=0 when no cybersecurity threats have been detected.

Virtual network 500 includes a plurality of virtual systems 510, 515, and 520, which are being monitored by a hypervisor 505. In the example embodiment, virtual network 500 is a part of an aircraft, such as aircraft 102, and provides communication between the various client systems 214 associated with aircraft 102, shown in FIG. 2. In the example embodiments, virtual network 500 is hosted on distributed series of computer devices within aircraft 102. In some embodiments, hypervisor 505 is hosted on CSM server 212, shown in FIG. 2. In other embodiment, hypervisor 505 is in communication with CSM server 212.

Hypervisor 505 (also known as a virtual machine monitor) creates and runs a plurality of virtual systems 510, 515, 520 (also known as virtual machines). In some embodiments, virtual systems 510, 515, and 520 are each associated with a different client system 214, shown in FIG. 2. In some other embodiments, virtual systems 510, 515, and 520 each are associated with multiple client systems 214. In some embodiments, virtual systems 510, 515, and 520 monitor client systems 214. In other embodiments, virtual systems 510, 515, and 520 also control client systems 214. This control may be through instructions transmitted to the corresponding client system 214. In the example embodiment, virtual systems 510, 515, and 520 are virtual machines that are being executed on one or more client systems 214. In the example embodiments, virtual systems 510, 515, and 520 control client systems 214 and through those client systems 214, one or more control systems that affect the operation of aircraft 102.

Hypervisor 505 and virtual systems 510, 515, and 520 communicate via communication channels 525, such as, but not limited to, a local area network (LAN), a wide area network (WAN), a virtual local area network (VLAN) or a wireless communication protocol connection.

In still other embodiments, hypervisor 505 generates multiple virtual machines to divide up the operations of one client system 214. Hypervisor 505 segregates the functionality associated with client system 214 across the multiple virtual machines. Each virtual machine communicates with an encrypted communication channel. In some embodiments, each communication channel is encrypted individually. Therefore each virtual machine would have different configuration and security settings to minimize the risk of compromise by cybersecurity threat 530. In still further embodiments, the functionality is separated across virtual machines that exist in different network segments. These virtual machines communicate through encrypted point-to-point VLANs or tunnels.

FIG. 6 is a simplified block diagram of virtual network 500 shown in FIG. 5 after a cybersecurity threat 530 is detected. FIG. 6 represents virtual network 500 at time t=1, after a cybersecurity threat has been detected, but before a response has been performed by CSM server 212, shown in FIG. 2. In this Figure, cybersecurity threat 530 has been detected on virtual system A 510. The detection of cybersecurity threat 530 prompts CSM server 212 to attempt to identify which particular cybersecurity threat 530 is on virtual system A 510. In the example embodiment, CSM server 212 determines the signature of cybersecurity threat 530 and compares the signature to a threat database 220 that contains information on a plurality of cybersecurity threats.

FIG. 7 is a simplified block diagram of virtual network 500 shown in FIG. 5 showing a potential response to cybersecurity threat 530 detected in FIG. 6. FIG. 7 represents virtual network 500 at time t=2, when CSM server 212 has identified cybersecurity threat 530 and isolated virtual system A 510 from the rest of virtual network 500.

CSM server 212 instructed hypervisor 505 to recreate virtual system A 510 as virtual system AA 535. In the example embodiment, hypervisor 505 generates virtual system AA 535 based on the last known good state of virtual system A 510. Then hypervisor 505 isolates infected virtual system A 510 from virtual network 500 and connects virtual system AA 535 to virtual network 500 to replace the infected system. Hypervisor 505 severs the connections 540 between compromised virtual system A 510 and the rest of virtual network 500. Hypervisor 505 resets those connections 525 from virtual network 500 to virtual system AA 535.

In the example embodiment, hypervisor 505 does not destroy compromised virtual system A 510. Instead, compromised virtual system A 510 remains in place to not alert cybersecurity threat 530 to the fact that the system that it is on has been removed from the network. In some embodiments, hypervisor 505 keeps a communication link 545 open between itself and the compromised virtual system A 510. Hypervisor 505 uses this communication link 545 to monitor the actions of cybersecurity threat 530. In some further embodiments, hypervisor 505 assists virtual system A 510 in spoofing commands and actions to allow cybersecurity threat 530 to believe that it is still affecting virtual network 500 and any associated systems. In this way, hypervisor 505 gathers forensic evidence and other information about cybersecurity threat to assist in potential future litigation, criminal actions, and to assist in designing responses to cybersecurity threats. After hypervisor 505 or CSM server 212 has determined that enough useful information about cybersecurity threat 530 has been gathered, compromised virtual system A 510 may be powered down.

In the exemplary embodiment, hypervisor 505 modifies virtual system AA 535 before connecting it to virtual network 500. Since the last known good state of virtual system 510 would still potentially have the same vulnerability that cybersecurity threat 530 used to breach virtual system A 515, hypervisor 505 alters virtual system AA 535 in response to the identified cybersecurity threat 530. This alteration is designed to hinder cybersecurity threat 530 from gaining access to virtual system AA 535. Some example alterations include, but are not limited to, adjusting router settings, changing one or more IP addresses associated with the virtual system A 510, changing at least one firewall rule, closing a port on virtual system AA 535, closing a service on virtual system AA 535, and changing a service on virtual system AA 535.

FIG. 8 is a flowchart illustrating an example of a process 800 of responding to cybersecurity threat 530 (shown in FIG. 6) using system 200 shown in FIG. 2, in accordance with one embodiment of the disclosure. Process 800 may be implemented by a computing device, for example CSM server 212 (shown in FIG. 2).

In the example embodiment, CSM server 212 monitors 805 virtual network 500 including plurality of virtual machines 510, 515, and 520 (all shown in FIG. 5). CSM server 212 detects 810 one or more cybersecurity threats 530 to a first virtual machine 510 of the plurality of virtual machines. CSM server 212 generates 815 a second virtual machine 535 based on the first virtual machine 510. CSM server 212 adjusts 820 second virtual machine 535 based on cybersecurity threat 530. CSM server 212 disconnects 825 first virtual machine 510 from virtual network 500 to prevent communication between first virtual machine 510 and the plurality of virtual machines included in virtual network 500. CSM server 212 connects 830 second virtual machine 535 to virtual network 500. In some embodiments, CSM server 212 powers down second virtual machine to conserve computing resources.

In some embodiments, first virtual machine 510 is connected to a control system, such as a control system of aircraft 102. These control systems control at least one flight-based function of aircraft 102. In these embodiments, CSM server 212 disconnects first virtual machine 510 from the control system to prevent communication between first virtual machine 510 and the control system. CSM server 212 connects second virtual machine 535 to the control system.

In some other embodiments, CSM server 212 emulates 835 legitimate traffic to and from first virtual machine 510. CSM server 212 spoofs cybersecurity threat 530 to convince cybersecurity threat 530 that it is still connected to and affecting virtual network 500. In these embodiments, CSM server 212 receives one or more instructions for first virtual machine 510 from cybersecurity threat 530. CSM server 212 generates one or more false responses based on the one or more instructions and transmits the one or more false responses to first virtual machine 510, so that it appears to cybersecurity threat 530 that the one or more instructions were followed.

In further embodiments, CSM server 212 monitors the actions of cybersecurity threat 530 for future use. In these embodiments, CSM server 212 monitors one or more actions of cybersecurity threat 530 in first virtual machine 510. CSM server 212 then stores the one or more monitored actions of the cybersecurity threat. In some further embodiments, CSM server 212 transmits the one or more monitored actions of cybersecurity threat 530 to remote central controller 222, shown in FIG. 2.

Infections from cybersecurity threats are not limited one system at a time, and CSM server 212 may detect that multiple virtual systems are infected. In these situations, CSM server 212 may generate a plurality of new and altered virtual systems to replace the infected systems. For example, CSM server 212 detects cybersecurity threat 530 in a third virtual machine 515. CSM server 212 generates a fourth virtual machine based on the third virtual machine 515. CSM server 212 disconnects the third virtual machine from virtual network 500 and connects the fourth virtual machine to virtual network 500.

In the example embodiment, CSM server 212 adjusts second virtual system 535 to prevent cybersecurity threat 530 from accessing second virtual system 535 the same what that it access first virtual system 510. In some embodiments, CSM server 212 analyzes cybersecurity threat 530 detected in first virtual machine 510. CSM server 212 identifies cybersecurity threat 530 based on the analysis by comparing the cybersecurity threat to the stored threat database, such as database 220 (shown in FIG. 2). If cybersecurity threat 530 is stored in threat database 220, CSM server 212 determines a course of action based on the identified cybersecurity threat 530 and threat database 220. If cybersecurity threat 530 is not stored in threat database 220, CSM server 212 transmits information regarding cybersecurity threat 530 to remote central controller 222 (shown in FIG. 2). CSM server 212 receives the course of action from remote central controller 222 based on the transmitted information. CSM server 212 performs the received course of action. In some embodiments, the information regarding cybersecurity threat 530 is a signature of the threat (also known as an indicator of compromise). CSM server 212 and remote central controller 222 use this signature to identify cybersecurity threat 530.

If the CSM server 212 did not have to request a course of action from remote central controller 222, then CSM server 212 stores the determined course of action and information about cybersecurity threat 530 in threat database 220. In the example embodiment, CSM server 212 transmits the stored information to remote central controller 222 at a future time, such as when aircraft 102 is at gate 110 (shown in FIG. 1).

In some embodiments, before communicating with remote central controller 222, CSM server 212 determines a current bandwidth of communications with remote central controller 222. If the determined current bandwidth exceeds a predetermined threshold, CSM server 212 opens communication with remote central controller 222. These communications may include requests for updates to threat database 220, a request for a course of action in response to an active or past cybersecurity threat 530, or information that CSM server 212 collected regarding cybersecurity threat 530.

In some further embodiments, CSM server 212 may determine that there is no available course of action for responding to cybersecurity threat 530. For example, CSM server 212 is unable to identify cybersecurity threat 530. In these embodiments, one course of action is for CSM server 212 to generate a new bare-bones virtual network. Disconnect virtual network 500 and replace virtual network 500 with the new bare-bones virtual network. In these embodiments, CSM server 212 may monitor the actions of cybersecurity threat 530 on virtual network. In other embodiments, CSM server 212 deletes virtual network 500 completely. In the example embodiment, aircraft 102 runs on the bare-bones network until it lands and virtual network 500 can be safely reactivated.

In some further embodiments, CSM server 212 determines not to run a bare-bones network, but instead monitors cybersecurity threat 530 for future analysis to determine a course of action. In these embodiments, a bare-bones network may prevent CSM server 212 from dealing with future intrusions. CSM server 212 makes this determination based on the nature and severity of cybersecurity threat 530. For example, CSM server 212 generates the second virtual network, transitions the important services to the second network, and maintains the compromised virtual network 500 to monitor for intelligence collection.

In some embodiments, CSM server 212 is segregated from virtual network 500 to prevent cybersecurity threat 530 from affecting CSM server 212. In these embodiments, CSM server 212 communicates via encrypted communications to each node or virtual machine. In at least one embodiment, CSM server 212 is on a management virtual LAN.

Figure 9:
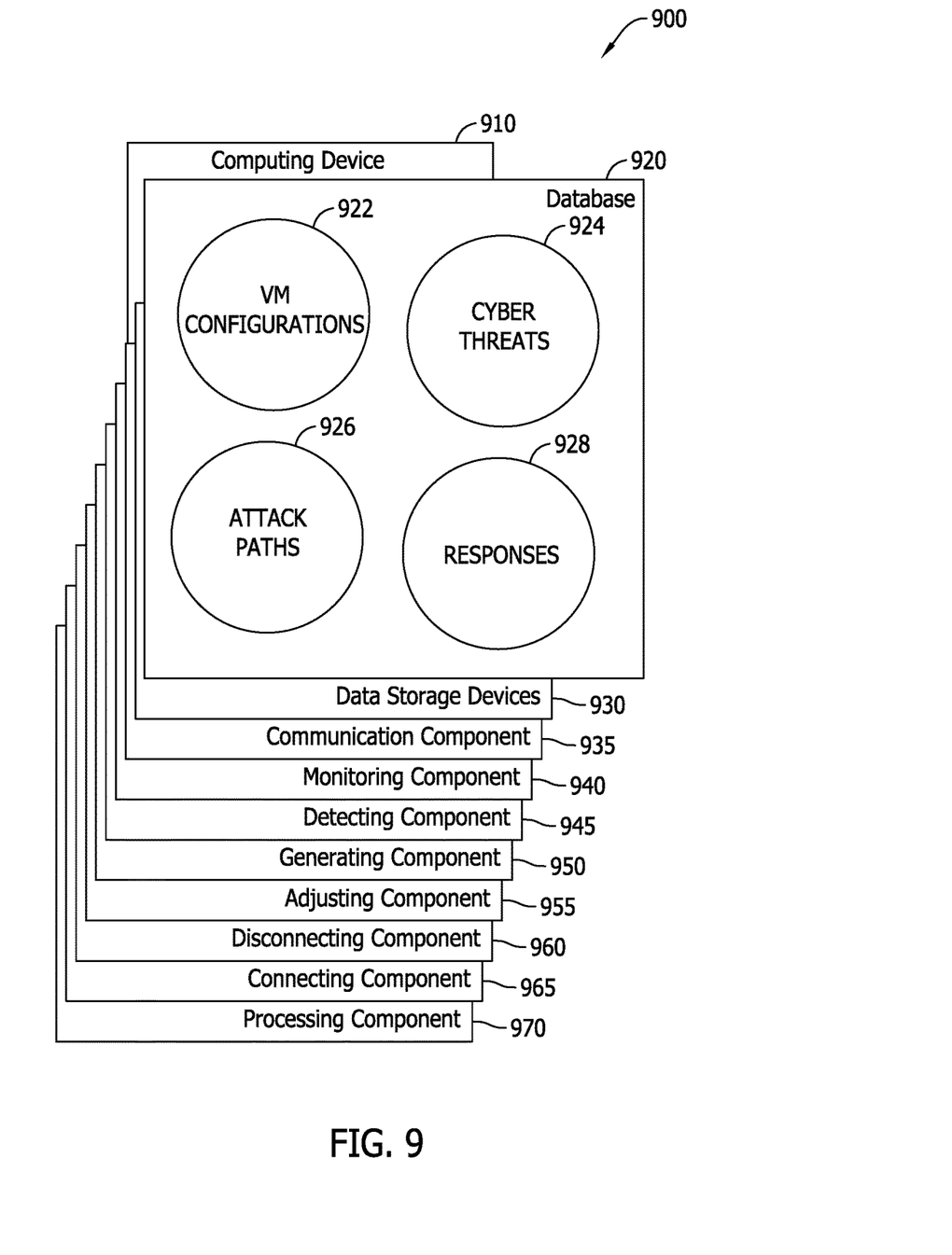
FIG. 9 is a diagram of components of one or more example computing devices that may be used in the system shown in FIG. 2.

FIG. 9 is a diagram 900 of components of one or more example computing devices that may be used in the system 200 shown in FIG. 2. In some embodiments, computing device 910 is similar to CSM server 212 (shown in FIG. 2). Database 920 may be coupled with several separate components within computing device 910, which perform specific tasks. In this embodiment, database 920 includes VM Configurations 922, Cyber Threats 924, Attack Paths 926, and Responses 928. In some embodiments, database 920 is similar to database 220 (shown in FIG. 2).

Computing device 910 includes the database 920, as well as data storage devices 930. Computing device 910 also includes a communication component 935 for communicating with the virtual machines on the virtual network. Computing device 910 also includes a monitoring component 940 for monitoring 805 (shown in FIG. 8) virtual network 500 (shown in FIG. 5). Computer device 910 further includes a detecting component 945 for detecting 810 (shown in FIG. 8) cybersecurity threat 530 (shown in FIG. 6). A generating component 950 is also included for generating 815 (shown in FIG. 8) a second virtual machine 535 (shown in FIG. 7). Computing device 910 further includes an adjusting component 955 for adjusting 820 second virtual machine 535 (shown in FIG. 8). Moreover, a disconnecting component 960 is included for disconnecting 825 first virtual machine 510 from the virtual network 500 (shown in FIG. 8). In addition a connecting component 965 is included for connecting 830 second virtual machine 535 to virtual network 500 (shown in FIG. 8). A processing component 970 assists with execution of computer-executable instructions associated with the system.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The implementations described herein relate to systems and methods for responding to cybersecurity threats and, more specifically, for automatically responding to cybersecurity threats to a computer network in an aviation environment. More specifically, a cybersecurity monitoring ("CSM") computer device monitoring for one or more computer systems or computer networks for cyber-security threats and attacks, identifying detected cybersecurity threats and attacks, responding to the detected cybersecurity threats and attacks, transmitting information about the detected cybersecurity threats and attacks to a ground controller, and receiving updates about potential cybersecurity threats and attacks to the ground controller.

In some embodiments, the CSM computer device monitors a virtual network that includes a plurality of virtual machines. The CSM computer device detects one or more cybersecurity threats to a first virtual machine of the plurality of virtual machines. The CSM computer device generates a second virtual machine based on the first virtual machine. The CSM computer device adjusts the second virtual machine based on the cybersecurity threat. The CSM computer device disconnects the first virtual machine from the virtual network to prevent communication between the compromised first virtual machine and the plurality of virtual machines included in the virtual network. The CSM computer device then connects the second virtual machine to the virtual network.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cyber-security monitoring (CSM) computer device for responding to cybersecurity threats, said CSM computer device comprising a processor in communication with a memory, said processor configured to: monitor a virtual network including plurality of virtual machines; detect a cybersecurity threat to a first virtual machine of the plurality of virtual machines; generate a second virtual machine based on an uncompromised version of the first virtual machine; adjust the second virtual machine to resist the cybersecurity threat; disconnect the first virtual machine from the virtual network to prevent communication between the first virtual machine and the plurality of virtual machines included in the virtual network; connect the second virtual machine to the virtual network in place of the first virtual machine, and subsequent to the disconnect of the first virtual machine, spoof one or more commands from the first virtual machine in response to the cybersecurity threat.

2. A CSM computer device in accordance with claim 1, wherein the first virtual machine is connected to a control system that controls at least one flight based system of an aircraft, and wherein said processor is further configured to: disconnect the first virtual machine from the control system to prevent communication between the first virtual machine and the control system; and connect the second virtual machine to the control system.

3. A CSM computer device in accordance with claim 1, wherein said processor is further configured to: receive one or more instructions for the first virtual machine from the cybersecurity threat; generate one or more false responses based on the one or more instructions; and transmit the one or more false responses, so that it appears to the cybersecurity threat that the one or more instructions were followed.

4. A CSM computer device in accordance with claim 1, wherein said processor is further configured to: monitor one or more actions of the cybersecurity threat in the first virtual machine; and store the one or more monitored actions of the cybersecurity threat.

5. A CSM computer device in accordance with claim 4 wherein said processor is further configured to transmit the one or more monitored actions of the cybersecurity threat to a remote central controller.

6. A CSM computer device in accordance with claim 1, wherein said processor is further configured to: detect the cybersecurity threat in a third virtual machine; generate a fourth virtual machine based on the third virtual machine; disconnect the third virtual machine from the virtual network; and connect the fourth virtual machine to the virtual network.

7. A CSM computer device in accordance with claim 1, wherein said processor is further configured to adjust the second virtual machine based on the cybersecurity threat and a vulnerability of the first virtual machine potentially used by the cybersecurity threat.

8. A CSM computer device in accordance with claim 1, wherein said processor is further configured to store, in a threat database, a plurality of cybersecurity threats, attack paths, and responses.

9. A CSM computer device in accordance with claim 8, wherein said processor is further configured to: analyze the cybersecurity threat detected in the first virtual machine; identify the cybersecurity threat based on the analysis by comparing the cybersecurity threat to the threat database; and if the cybersecurity threat is stored in the threat database, determine a course of action based on the cybersecurity threat and the threat database.

10. A CSM computer device in accordance with claim 9, wherein said processor is further configured to: if the cybersecurity threat is not stored in the threat database, transmit information regarding the cybersecurity threat to a remote central controller; and receive the course of action from the remote central controller based on the information.

11. A CSM computer device in accordance with claim 9, wherein said processor is further configured to store the cybersecurity threat and the determined course of action.

12. A CSM computer device in accordance with claim 10, wherein said processor is further configured to transmit the cybersecurity threat and the determined course of action to the remote central controller.

13. A CSM computer device in accordance with claim 8, wherein said processor is further configured to: determine that there is no course of action available in the threat database for the cybersecurity threat; generate a bare-bones virtual network; disconnect the virtual network; and replace the virtual network with the bare-bones virtual network.

14. A CSM computer device in accordance with claim 10, wherein said processor is further configured to: determine a current bandwidth of communications with the remote central controller; if the determined current bandwidth exceeds a predetermined threshold, request an update to the threat database from the remote central controller; and receive the update to the threat database.

15. A CSM computer device in accordance with claim 1, wherein said processor is further configured to adjust the second virtual machine by performing at least one of the following actions: adjust router settings, change one or more Internet Protocol (IP) addresses associated with the first virtual machine, change at least one firewall rule, close a port on the second virtual machine, close a service on the second virtual machine, and change a service on the second virtual machine.

16. A CSM computer device in accordance with claim 1, wherein said CSM computer device and the virtual network are located on an aircraft, and wherein the plurality of virtual machines control at least one flight-based function of the aircraft.

17. A system for responding to cybersecurity threats, said system comprising: a plurality of computer devices configured to run a virtual network including a plurality of virtual machines; and a cyber-security monitoring (CSM) computer device comprising a processor in communication with a memory, said CSM computer device configured to: monitor the virtual network; detect a cybersecurity threat to a first virtual machine of the plurality of virtual machines; generate a second virtual machine based on an uncompromised version of the first virtual machine; adjust the second virtual machine to resist the cybersecurity threat; disconnect the first virtual machine from the virtual network to prevent communication between the first virtual machine and the plurality of virtual machines included in the virtual network; connect the second virtual machine to the virtual network in place of the first virtual machine; and subsequent to the disconnect of the first virtual machine, spoof one or more commands from the first virtual machine in response to the cybersecurity threat.

18. A system in accordance with claim 17, wherein the first virtual machine is connected to a control system that controls at least one flight based system of an aircraft, and wherein said CSM computer device is further configured to: disconnect the first virtual machine from the control system to prevent communication between the first virtual machine and the control system; and connect the second virtual machine to the control system.

19. A method for responding to cybersecurity threats, said method implemented using a cyber-security monitoring (CSM) computer device, said CSM computer device comprising a processor in communication with a memory, said method comprising: monitoring a virtual network including plurality of virtual machines; detecting a cybersecurity threat to a first virtual machine of the plurality of virtual machines; generating a second virtual machine based on the first virtual machine; adjusting the second virtual machine based on the cybersecurity threat; disconnecting the first virtual machine from the virtual network to prevent communication between the first virtual machine and the plurality of virtual machines included in the virtual network; and connecting the second virtual machine to the virtual network in place of the first virtual machine; and subsequent to the disconnect of the first virtual machine, spoof one or more commands from the first virtual machine in response to the cybersecurity threat.

20. The method in accordance with claim 19, wherein the first virtual machine is connected to a control system, and wherein said method further comprises: disconnecting the first virtual machine from the control system to prevent communication between the first virtual machine and the control system; and connecting the second virtual machine to the control system.

* * * * *